March 18, 1930.  A. B. CUNNINGHAM  1,751,265
CO₂ RECORDER
Filed Sept. 16, 1921    5 Sheets-Sheet 1

March 18, 1930.  A. B. CUNNINGHAM  1,751,265
CO₂ RECORDER
Filed Sept. 16, 1921   5 Sheets-Sheet 3

Inventor.
Arthur B. Cunningham
By: Nissen & Crane Attys.

Inventor.
Arthur B. Cunningham
By: Nissen & Crane Attys.

Patented Mar. 18, 1930

1,751,265

UNITED STATES PATENT OFFICE

ARTHUR B. CUNNINGHAM, OF CHICAGO, ILLINOIS, ASSIGNOR TO REPUBLIC FLOW METERS CO., OF CHICAGO, ILLINOIS, A CORPORATION OF ILLINOIS

$CO_2$ RECORDER

Application filed September 16, 1921. Serial No. 501,077.

This invention relates to an instrument for producing a continuous record of the character of gases containing carbon dioxide, the instrument being of the same general nature as that shown in my prior Patent No. 1,311,952, dated August 5, 1919.

The invention has for its object the provision of an instrument of the class named which shall be of improved construction and operation. It is exemplified in the combination and arrangement of parts shown in the accompanying drawings, and described in the following specification, and is more particularly pointed out in the appended claims.

In the drawings—

Figs. 6 and 7 are fragmentary sectional views of details;

Figure 1:
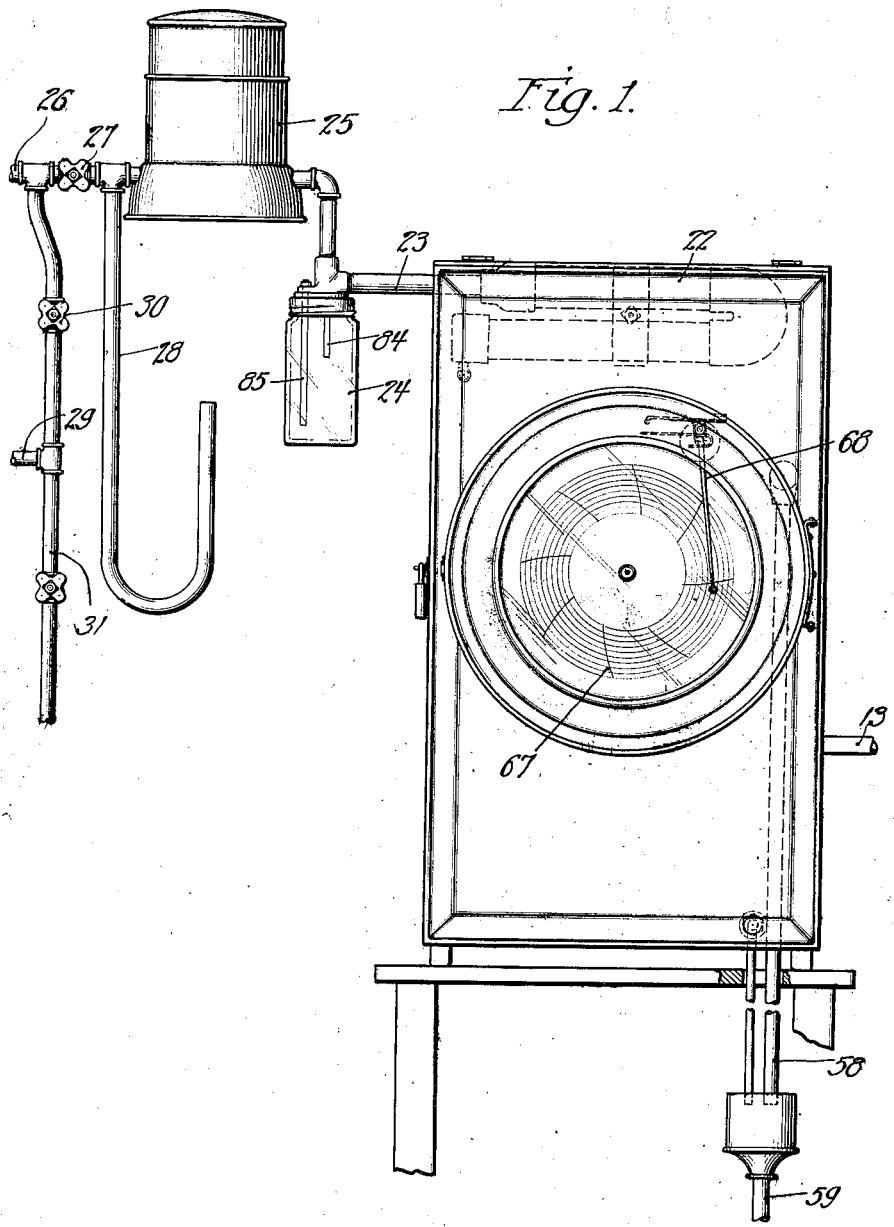
Fig. 1 is a front elevation of an instrument embodying one form of the present invention.

In the operation of various furnaces and for other purposes it is desirable to maintain a time record of the character of gases produced, such as the flue gases from furnace combustion, the records showing the percentage of certain constituents of the gas, such as $CO_2$ gas in the flue gases. The present invention has special application to the recording of the percentage of $CO_2$ gas in combustion products, but it will be understood that it is applicable to other uses than the particular ones specified.

The instrument illustrated in the drawings is enclosed in a case 10 having a door 11 hinged to the front thereof at 12. Within the case mechanism is provided for periodically measuring off a fixed quantity of gas to be tested passing the measured quantity of gas through a solution for absorbing one of its constituents and producing a time record of the percentage of the gas thus absorbed. In the case of flue gases caustic potash constitutes the agent for absorbing the carbon dioxide from the products of combustion, thus indicating the character of operation of the furnace producing the gas tested. The instrument is operated by a stream of water taken from a city main or other suitable source of water supply. The water enters the instrument through a pipe 13, it being preferable to interpose a strainer between the instrument and the source of supply to prevent foreign particles from entering the instrument. The water passes from the pipe 13 through an inverted U 15, Fig. 2, installed within an oil chamber 16 having an inverted bell 17 constituting a float for receiving the gas after the carbon dioxide has been removed therefrom. From the oil chamber 16 the pipe 15 leads upwardly through the top of the instrument and terminates in a nozzle 18 from which the water is discharged in a jet within an aspirator 19. From the aspirator 19 the water falls into a tank 20. The aspirator 19 is connected by a pipe 21 to a gas chamber 22 at the rear of the instrument casing so that the partial vacuum formed by the jet of water in the aspirator will tend to draw gas through the gas chamber 22. The chamber 22 is connected by a pipe 23 through an indicator 24 and a filter 25 with a pipe 26 which leads from the flue or other source from which the gas is taken.

Between the pipe 26 and the filter 25 a valve 27 is interposed and a trap 28 is also provided for collecting any water of condensation which may form in the pipe 26. For the purpose of cleaning out the gas line 26 from time to time a pipe 29 is connected with the line of the flue side of the valve 27. The pipe 29 communicates with any suitable source of steam or air pressure which may be admitted through valve 30 to the gas line 26 for blowing out soot or dust which may have collected within the line. A valve 31 communicates with the atmosphere for connecting the gas line with the air after the line has been blown out for clearing it of moisture which may have collected from the steam or compressed air. During the cleaning of the gas line the valve 27 will, of course, be closed to prevent pressure from entering the filter 25.

The aspirator 19 is for the purpose of producing a flow of gas to the chamber 22 so that when a sample of gas is taken from the chamber it will correspond to the gas in the flue at the particular time that the sample is taken.

Figure 2:
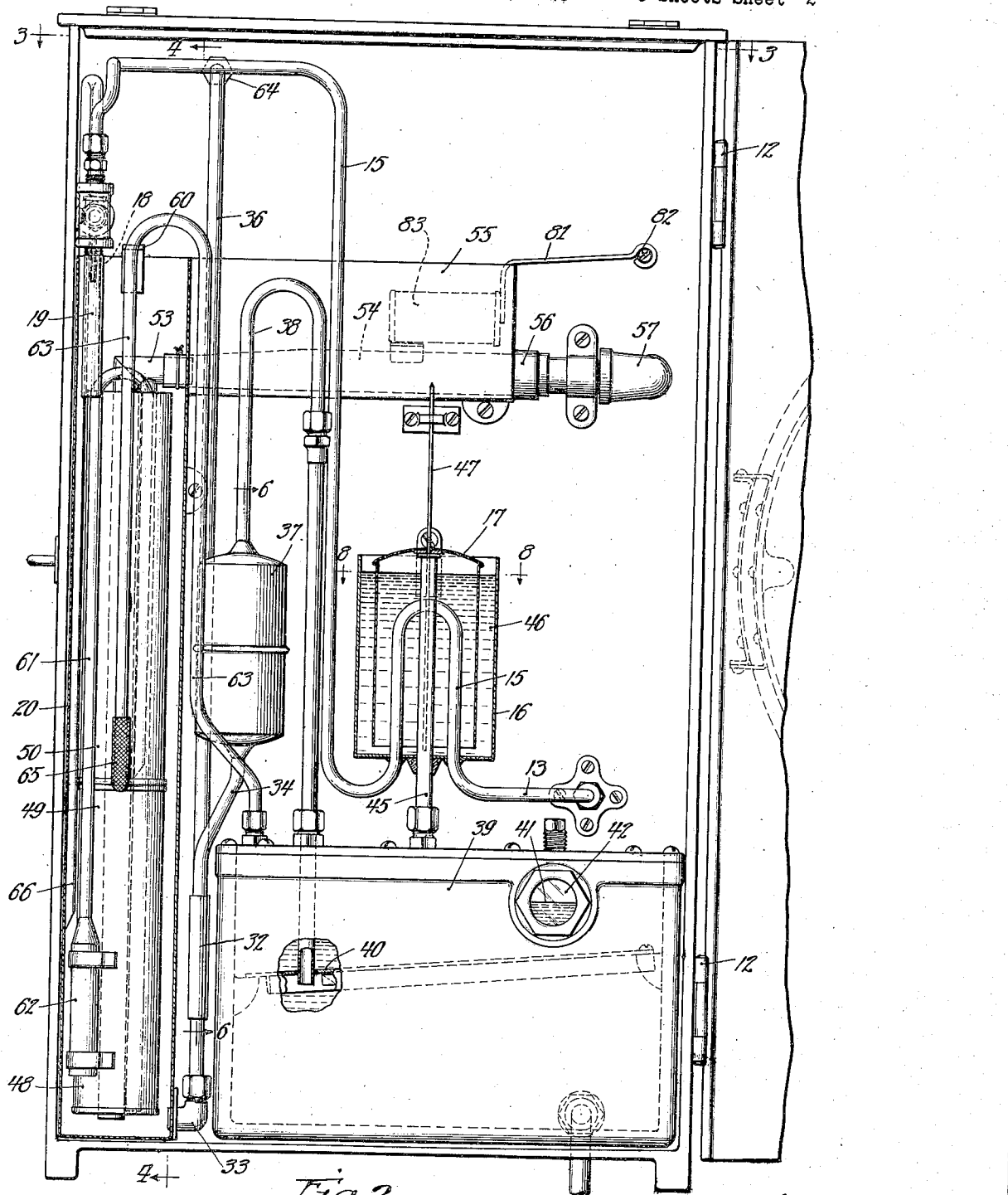
Fig. 2 is an elevation of the instrument shown in Fig. 1, with the front door open.
Figure 9:
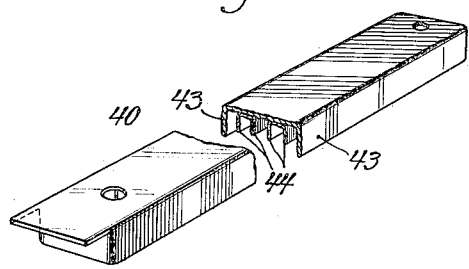
Fig. 9 is a perspective view of the baffle plate used in the caustic potash tank.

The water flowing from the open end of the aspirator 19 rises in the tank 20 and fills the manifold 32 connected at 33 to the lower end of the tank 20 and rises in the pipes 34, 35 and 36 leading upwardly from the manifold. The pipe 34 enters the lower end of a pipette 37 and the pipe 35 passes through the bottom wall of the pipette and opens near the upper portion of the interior thereof. The water rising in the pipes 34 and 35 seals off a definite quantity of gas in the pipette and as the water continues to rise it will force this gas outwardly through a discharge tube 38 which enters the top of a caustic potash tank 39 and opens below a baffle plate 40 within the tank. The tank 39 is air-tight and is filled with a caustic potash solution to a point near the top thereof, the surface 41 of the solution appearing through a peep-glass 42. The baffle plate 40, as shown in Fig. 9, is provided with side flanges 43 to hold the gas from passing upwardly about the sides of the baffle plate and causing it to travel through the solution to the upper right-hand end of the plate, as shown in Fig. 2. Flanges 44 project downwardly from the lower face of the plate 40 to break the gas up into streams so that it will more thoroughly contact with the potash solution. As the gas passes through the solution the carbon dioxide will be absorbed therefrom and the unabsorbed gas will escape through a pipe 45 into the measuring bell 17, the pipe 45 being arranged to discharge near the top of the bell above the oil seal 46 therein. The gas entering the bell 17 will move it upwardly and raise the rod 47 carried thereby an amount proportional to the quantity of gas remaining after the carbon dioxide has been absorbed therefrom. The water in the pipe 15 assists in preventing rise in the temperature of the oil from the heat of the gas which enters the bell and tends to maintain a uniform temperature at which the gas is measured.

Within the tank 20 is a float 48 comprising a lower sealed compartment 49 and an upper compartment 50 open at the top. A pair of pipes 51 and 52 of different sizes are attached to the side of the float 48 and both communicate with a horizontal tubular section 53, Figs. 2 and 7, to which a flexible tubing 54 is secured. The tank 20 is provided with an offset portion 55 at the upper end thereof in which the flexible tubing 54 is placed and from which it passes at 56, there being a tight connection between the tubing and the chamber where it passes through the end wall. The outer end of the tubing 56 communicates with a discharge pipe 57 which leads downwardly through a waste pipe 58 to an open-ended pipe 59 which may be connected with the sewer or other drain. The rising water in the chamber 20 will lift the float 48 until the pipe 53 strikes a stop 60 connected to the wall of the tank 20 which will arrest the upward movement of the float at a point where the upper open end of the float is slightly below the bend in pipe 38 since the float and pipe 53 are secured together, as stated above. When the water level in the tank 20 reaches the upper open end of the chamber 50 it will overflow into this chamber until the weight of the water overcomes the buoyancy of the float, causing the float to again sink to its lowered position carrying the pipe 53 with it below the surface of the water. In this position of the pipe 53 the water will be siphoned through the pipes 51 and 52 and the flexible tubing 54 and flow out through the waste pipe to the drain. A siphon tube 61 passes over the top edge of the chamber 50, the inner end being open near the bottom of the chamber, and the outer end being connected to an enlarged portion 62 which opens near the bottom of the tank 20. This siphon tube will draw the water from the chamber 50 as the level is lowered in the tank 20. If the outer leg of the siphon were of the same diameter as the inner leg throughout, it sometimes would happen that where a portion of the siphon contains air or gas the inner leg would not be entirely drained of the water. By increasing the size of the lower end of the tube 61 a greater volume of water will be discharged from the siphon so that the siphon tube 61 will be entirely cleared of water even though there may be gas or air present in the tube.

A pipe 63 leads from the upper portion of the caustic tank 39 over the top of the tank 20 and has its lower end disposed within the tank 20 at a point somewhat below the lower portion of the pipette 37. When the water level is lowered below the end of the pipe 63 it will open the seal to the space in the upper portion of the caustic tank 39 so that the gas in the bell 17 will flow downwardly through the pipe 45 and pass through the caustic tank and the pipe 63 and be discharged from the lower end of the pipe. As the surface level is lowered in the tank 20 the water will tend to flow from the pipette 37 into the tank reducing the pressure in the interior of the pipette. When the level reaches a point below the ends of the tubes 34, 35 and 36 in the manifold 32 gas will pass from the gas chamber 22 downwardly through pipe 36, the upper end of which connects directly with the gas chamber at 64. This gas will enter the pipes 34 and 35 and refill the pipette 37 and the manifold 32 with a new supply of gas taken directly from the gas chamber 22. This supply will constitute the charge to be tested at the next operation of the instrument. When the water again rises the gas in the manifold 32 will be discharged through the pipe 36 until the lower ends of the pipes 34, 35 and 36 are closed, sealing a definite quantity of gas in the pipette. The same volume is always discharged since the water always rises to the same level in the pipe 38 before it begins to flow into the chamber 50. When the water has all been drained from the tank 20 air will enter through the pipe 52 and break the siphon so that the operation will be repeated.

It has been found desirable to provide the tubes 51 and 52 of slightly different lengths to insure a complete breaking of the operation of the siphon. Where a single tube is used and water is continually flowing into the chamber it sometimes happens that before the water is all removed from the siphon the level in the tank 20 will have reached a sufficient height to seal the lower end of the tube and re-start a siphoning operation. The provision of two tubes, one of which is shorter than the other prevents this difficulty.

The lower end of the pipe 63 which connects with the upper portion of the caustic tank is preferably covered with a relatively fine mesh screen 65 which serves to prevent bubbles of air from entering the pipe 63 from the water within the tank 20 and thus increasing the volume of the charge of gas to be measured. If the lower end of the pipe 63 were entirely open a bubble of air or gas rising in the water directly beneath the open end of the pipe might pass upwardly through the pipe and mix with the gas in the caustic chamber thus affecting somewhat the accuracy of the measurement. Where the pipe is covered by a fine screen mesh it is found that such bubbles tend to roll upwardly on the outside of the screen and do not break up to enter the pipe 63.

Figure 4:
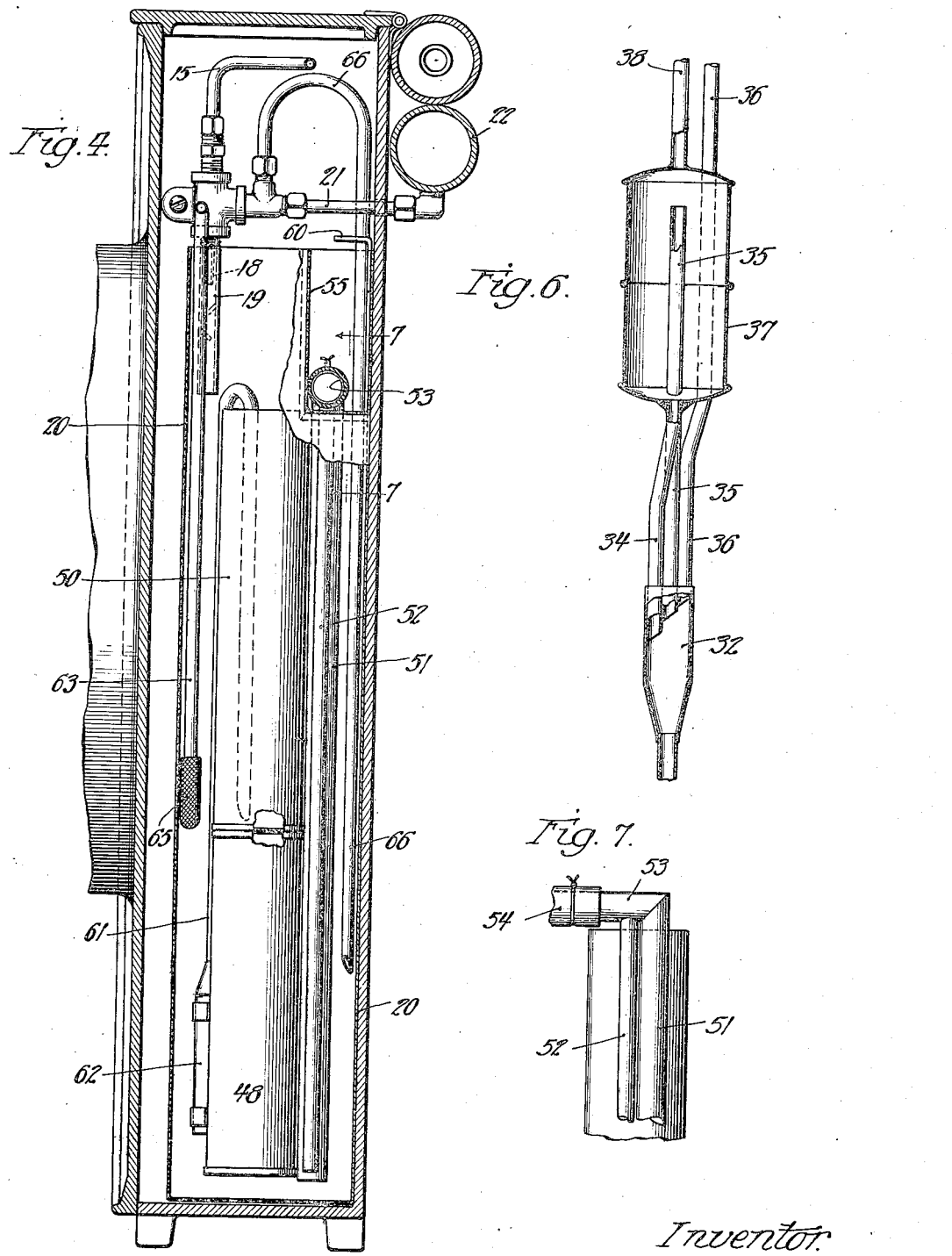
Fig. 4 is a vertical section substantially on line 4—4 of Fig. 2.
Figure 5:
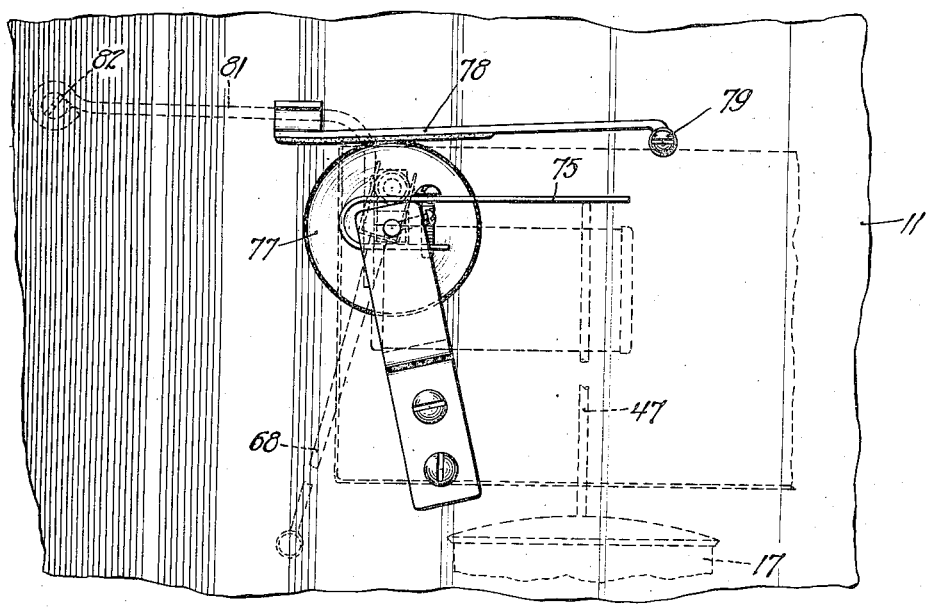
Fig. 5 is a fragmentary elevation of the interior face of the front door of the casing with cooperating parts shown in broken lines.
Figure 8:
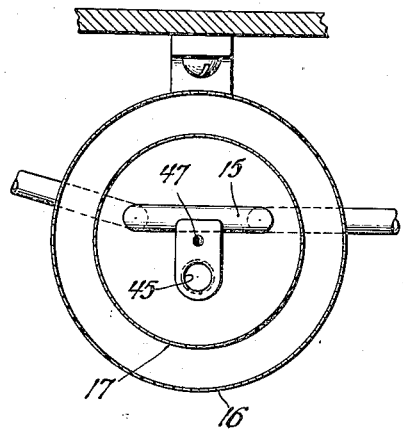
Fig. 8 is a horizontal section substantially on line 8—8 of Fig. 2.

It is desirable that the charge of gas to be tested shall be measured at atmospheric pressure and not at the pressure of the partial vacuum within the gas chamber 22 produced by the operation of the aspirator 19. To secure atmospheric pressure in the gas tank at the time that the charge is taken a pipe 66 is tapped into the connection 21 between the aspirator and the gas tank and has its lower end arranged to open within the tank 20, as shown in Fig. 4. The opening of the lower end of the tube 66 is slightly above the level of the open ends of the tubes 34, 35 and 36 so that at the time that communication is established between the pipette 37 and the gas chamber 22 the lower end of the tube 66 is unsealed to admit atmospheric pressure to the gas tank so that the quantity of gas measured in the pipette will be taken at the pressure of the atmosphere. It is noted that the tank 22 is large enough to contain considerable more gas than is required to fill the pipette 37. The tank 22 is formed in two sections, the pipe 21 being connected at one end of the lower section while the pipe 36 is connected at 64 to the remote end of the tank from the connection 21. The connection 64 is adjacent the supply pipe 23. When the lower end of the pipe 66 is open to atmosphere, there will be sufficient gas in the container 22 to supply the pipette 37 without dilution by air entering through the pipe 66.

Figure 3:
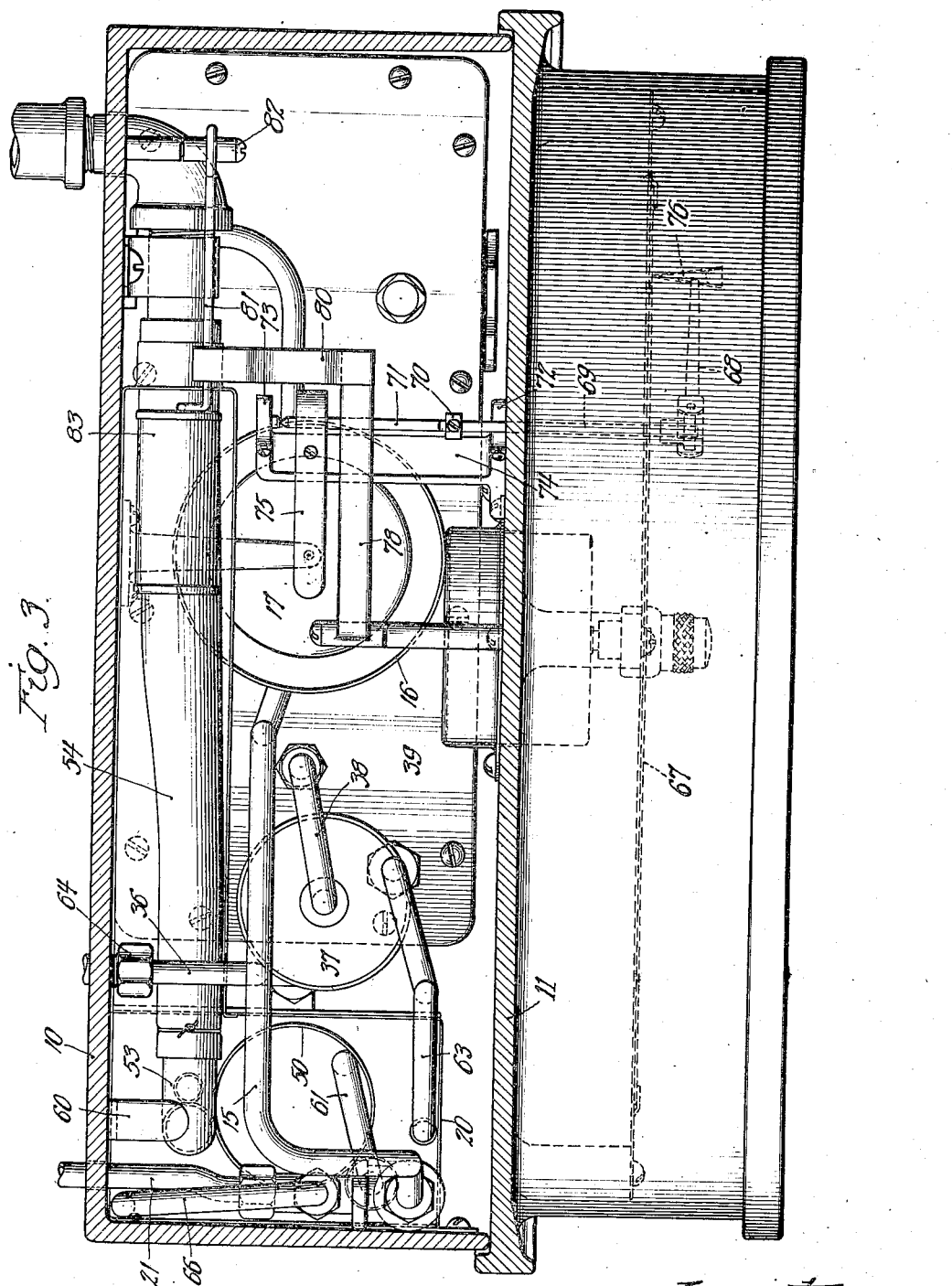
Fig. 3 is a horizontal section substantially on line 3—3 of Fig. 2.

By the mechanism described measured quantities of gas are periodically drawn from the source of supply and passed through a solution for removing one of the constituents and the residue measured. The period of a cycle of operation in practice is usually from two to three minutes. To keep a record of the quantity of residual gas a revolving chart 67 driven by clockwork is carried on the door of the instrument. A needle 68 is carried on a rod 69 secured by a block 70 to a rod 71 pivoted between bearings 72 and 73, Fig. 3, on a bracket 74 secured to the inner face of the door 11. The pivot rod 71 carries an arm 75 which is positioned directly above the rod 47 when the door 11 is closed. It will be apparent that each time the rod 47 is raised by the bell 17 the needle 68 will be swung toward the center of the chart 67 to a position corresponding to the amount of gas within the bell 17. A stylus 76 is carried at the end of the needle and records the position of the needle on the chart. It is apparent that if the needle were left free to move when the gas is discharged from the bell 17 the arm 75 would swing downwardly to its limiting position and throw the needle outwardly toward the periphery of the chart thus making a series of criss-cross lines on the chart. To prevent this a knurled disc 77 is secured to the pivot rod 71 and a weighted brake arm 78 is pivoted at 79 on the door 11 in position to rest upon the periphery of the knurled disc. This brake arm will prevent the arm 75 from following the rod 47 when the gas is discharged from the bell 17 so that after each operation of the instrument the stylus will continue to draw a line on the chart 67 in a position corresponding to the last reading of the instrument. The brake arm 78 is provided with a contact-piece 80 which overlies a rod 81 pivoted at 82 on the rear wall of the instrument case and secured at its opposite end to a float 83 within the offset portion 55 of the tank 20. When the water rises to its upper position in the tank the float 83 will be raised, thus lifting the brake 78 from the disc 77 and permitting the arm 75 to rest freely upon the upper end of the rod 47 so that the needle 68 will be moved to its proper position corresponding to the new charge in the bell 17. When the water begins to recede the brake 78 will again bear upon the disc 77 before the bell 17 is lowered so that the needle will again be held in the position to which it is moved by the rod 47.

The gas from the filter 25 enters the indicator 24 through a tube 84. The indicator 24 comprises a glass vessel which is filled with water to a point above the lower end of the tube 84 so that the gas is visible in the form of bubbles as it enters the instrument. This enables the operator to see if the gas line is operating properly. In case the gas line should become clogged in any way air will be drawn into the indicator 24 through a tube 85 which communicates with the atmosphere. When this occurs there will be no carbon dioxide in the air fed to the pipette 37 and the needle 68 will register zero so that the operator will immediately see that the pipe line requires cleaning.

From the above description, it will be seen that by means of the float 48 and siphoning mechanism associated therewith the tank 20 is alternately filled and emptied by water entering from the supply main. At each cycle a definite quantity of gas from tank 22 is entrapped in the pipette 37 and forced from there through the potash tank into the measuring bell 17. The $CO_2$ gas is absorbed in the potash tank so that the height to which the tank 17 rises will be an indication of the proportion of $CO_2$ gas in the sample tested. By means of the recorder a chart is kept of the height to which the bell 17 rises.

I claim:—

1. An instrument for indicating the nature of gases comprising means for drawing a definite predetermined quantity of gas from a source of supply, and means establishing free communication between the gas and the atmosphere for submitting the gas thus drawn to the pressure of the atmosphere and for sealing off the predetermined quantity while at said atmospheric pressure.

2. An instrument for indicating the nature of gases comprising a chamber for containing a supply of gas to be tested, means for producing a partial vacuum in said chamber to draw gas thereto, means for drawing from said chamber a quantity of gas to be tested, and means establishing communication between said gas chamber and the atmosphere for submitting the gas within said chamber to atmospheric pressure at the time that the quantity of gas to be tested is drawn therefrom.

3. An instrument for indicating the nature of gases comprising a chamber for containing gas to be tested, means for submitting said chamber to partial vacuum to draw gas thereto from a source of supply, means for measuring off a predetermined quantity of gas from said chamber, and means establishing free communication between said gas and the atmosphere for submitting the gas thus measured off to atmospheric pressure at the time that it is measured.

4. An instrument for indicating the nature of gases comprising a chamber for containing gas to be tested, a water seal for said chamber, means for measuring off a predetermined quantity of gas from said chamber, and means establishing communication between said gas and the atmosphere for opening said seal to atmosphere when said predetermined quantity of gas is measured off therefrom.

5. An instrument for indicating the nature of gases comprising a chamber for containing gas to be tested, means for submitting said chamber to partial vacuum to draw gas therethrough from a source of supply, a water-sealed opening connected with said chamber, a vessel for measuring a predetermined quantity of gas from said chamber to be tested, means for connecting said vessel with said chamber to receive gas therefrom, means for closing the connection between said vessel and said chamber, and means for connecting said water seal opening to atmospheric pressure at the time that said vessel is filled with gas from said chamber and sealed off therefrom.

6. In a $CO_2$ recorder, a chamber for containing a quantity of gas to be tested, a water jet aspirator connected with said chamber to cause a flow of gas therethrough from a source of supply, a connection between said chamber and said aspirator, and means establishing communication between said chamber and the atmosphere for submitting said chamber to atmospheric pressure at times in the operation of said recorder.

7. In a $CO_2$ recorder, a chamber for containing gas to be tested, a jet operated aspirator for submitting said chamber to partial vacuum to cause a flow of gas therethrough from a source of supply, periodically operated measuring apparatus for drawing gas from said chamber to be tested, means for sealing off from said chamber predetermined quantities of gas drawn therefrom, a water-controlled seal connected with said chamber, and means for opening said seal to atmosphere at the time that the predetermined quantities of gas are sealed off in said chamber.

8. An instrument for indicating the nature of gases comprising a chamber for containing gas to be tested, a discharge conduit connected with said chamber, a water seal for said conduit, and a reticulated screen for said seal to prevent entrance of gas bubbles through said discharge conduit into said chamber.

9. An instrument for indicating the nature of gases comprising a chamber for containing gas to be tested, a water tank for controlling said instrument, mechanism for causing alternate rise and fall of the water level in said tank, a conduit extending from said gas chamber into said tank, and a screen positioned over the opening of said conduit in said tank to prevent the entrance of gas bubbles from the water of said tank in said conduit.

10. In a $CO_2$ recorder, a caustic potash tank, a water tank and a conduit connected with the upper portion of said caustic potash tank and extending into said water tank, the open end of said conduit in said water tank being directed downwardly, and a fine mesh screen arranged to cover said open end.

11. An instrument for indicating the nature of gases comprising a tank having a float therein, and a siphon for discharging water from said float, said siphon having an enlarged portion in the discharge leg thereof to augment the discharging operation of said siphon.

12. An instrument for indicating the nature of gases having mechanism for periodically measuring off predetermined quantities of gas to be tested, said mechanism comprising a water tank having a float therein, and a siphon for discharging water from said float, said siphon having its short leg arranged within said float and its long leg arranged to discharge into said tank, said long leg having an enlarged portion for augmenting the discharging operation of said siphon.

13. The combination with a $CO_2$ recorder, of a conduit for supplying gas thereto, means for submitting said conduit to fluid under pressure to clear said conduit, and means for closing said conduit to said $CO_2$ recorder during said clearing operation.

14. The combination with a $CO_2$ recorder, of a conduit for supplying gas to said recorder, means for submitting said conduit to fluid under pressure to clear said conduit, means for closing off said conduit to said recorder during said clearing operation, and means for opening said conduit to atmospheric air after a clearing operation.

15. The combination with a $CO_2$ recorder, of a conduit for supplying gas thereto, an indicator connected with said conduit for showing the flow of gas to said recorder, a filter in said conduit for cleaning the gas passing therethrough, a trap connected with said conduit for catching moisture therein, and means connected with said conduit for blowing material therefrom.

16. A gas analyzer comprising a tank for holding a supply of gas, a measuring chamber, said tank having a greater capacity than said chamber, a connection from said tank to a source of supply, means for drawing gas through said tank from said source of supply, means for connecting said tank with said measuring chamber for a limited period of time to draw a quantity of gas from said tank to said measuring chamber, and means for connecting said tank to atmosphere simultaneously with the connection of said tank to said measuring chamber.

17. A gas analyzer comprising a tank for holding a supply of gas, a measuring chamber, a connection from said tank to a source of supply, a pumping device for drawing gas from said source of supply through said tank, a downwardly extending tube open at its lower end and connected with said tank, a seal for said lower end of said tube, means for connecting said measuring device with said tank for a limited period of time to draw a charge of gas from said tank, and means for opening the seal at the lower end of said tube simultaneously with the connection of said measuring device with said tank.

In testimony whereof I have signed my name to this specification on this 7th day of September, A. D. 1921.

ARTHUR B. CUNNINGHAM.